(12) United States Patent
Kamoshida et al.

(10) Patent No.: US 8,976,280 B2
(45) Date of Patent: *Mar. 10, 2015

(54) DISTORTION ESTIMATING IMAGE PROCESSING DEVICE, METHOD, AND NON-TRANSITORY STORAGE MEDIUM

(75) Inventors: Yukio Kamoshida, Bunkyo-ku (JP); Jun Nyukai, Bunkyo-ku (JP); Kensuke Habuka, Bunkyo-ku (JP); Masaki Hiraga, Bunkyo-ku (JP)

(73) Assignee: Morpho, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/824,512

(22) PCT Filed: Jul. 6, 2011

(86) PCT No.: PCT/JP2011/065475
§ 371 (c)(1),
(2), (4) Date: Mar. 18, 2013

(87) PCT Pub. No.: WO2013/005316
PCT Pub. Date: Jan. 10, 2013

(65) Prior Publication Data
US 2013/0182135 A1 Jul. 18, 2013

(51) Int. Cl.
*H04N 3/14* (2006.01)
*G06K 9/00* (2006.01)
*H04N 5/232* (2006.01)

(52) U.S. Cl.
CPC ......... *H04N 5/23267* (2013.01); *H04N 5/2329* (2013.01)
USPC ............................ 348/296; 348/294; 382/100

(58) Field of Classification Search
USPC .................. 348/294–296; 382/100, 107, 275
See application file for complete search history.

(56) References Cited

U.S. PATENT DOCUMENTS

| | | | |
|---|---|---|---|
| 6,188,058 B1 | 2/2001 | Tullis | |
| 6,977,985 B2 | 12/2005 | Bohn et al. | |
| 7,260,270 B2 | 8/2007 | Kusaka | |
| 7,307,655 B1 | 12/2007 | Okamoto et al. | |
| 7,880,778 B2 | 2/2011 | Kamon | |

(Continued)

FOREIGN PATENT DOCUMENTS

| | | |
|---|---|---|
| JP | 62-025588 A | 2/1987 |
| JP | 2005-252753 A | 9/2005 |

(Continued)

OTHER PUBLICATIONS

Office Action issued by U.S. Patent Office in U.S. Appl. No. 13/541,897 mailed Jan. 21, 2014.

(Continued)

*Primary Examiner* — Joel Fosselman
(74) *Attorney, Agent, or Firm* — Sughrue Mion, PLLC

(57) ABSTRACT

An image processing device includes an image input portion, a motion vector acquisition portion and a distortion component estimation portion. The image input portion inputs a target image which is an image to be processed. The motion vector acquisition portion acquires a motion vector generated by relative movement with respect to a subject drawn in the target image when an imaging device which has generated the target image generates the target image. The distortion component estimation portion estimates a rolling shutter distortion component of the target image based on the motion vector.

9 Claims, 13 Drawing Sheets

(56) References Cited

U.S. PATENT DOCUMENTS

| | | |
|---|---|---|
| 7,978,221 B2 | 7/2011 | Hiraga et al. |
| 8,218,032 B2 | 7/2012 | Nagashima et al. |
| 2007/0120997 A1 | 5/2007 | Sasaki et al. |
| 2007/0147706 A1 | 6/2007 | Sasaki et al. |
| 2009/0160957 A1 | 6/2009 | Deng et al. |
| 2009/0190013 A1 | 7/2009 | Hiraga et al. |
| 2010/0208087 A1 | 8/2010 | Ogawa |
| 2010/0214423 A1 | 8/2010 | Ogawa |
| 2010/0321517 A1 | 12/2010 | Yamamoto |

FOREIGN PATENT DOCUMENTS

| | | |
|---|---|---|
| JP | 2007-180734 A | 7/2007 |
| JP | 2009-141717 A | 6/2009 |
| JP | 2010-193301 A | 9/2010 |
| JP | 2010-193302 A | 9/2010 |
| JP | 2011-035891 A | 2/2011 |
| JP | 2011-114649 A | 6/2011 |

OTHER PUBLICATIONS

Notice of Allowance issued by Japanese Patent Office in Japanese Patent Application No. 2012-041715 dated Oct. 29, 2013.

International Search Report in International Application No. PCT/JP2011/065475 dated Aug. 9, 2011.

European Search Report issued in European Application No. 12175159.8 dated Nov. 22, 2012.

Office Action issued by Japanese Patent Office in Japanese Application No. 2012-557741 dated Sep. 10, 2013.

International Preliminary Report on Patentability in International Application No. PCT/JP2011/065475 dated Jan. 16, 2014.

European Search Report issued in European Application No. 11869190.6 mailed Aug. 21, 2014.

DISTORTION ESTIMATING IMAGE PROCESSING DEVICE, METHOD, AND NON-TRANSITORY STORAGE MEDIUM

CROSS REFERENCE TO RELATED APPLICATIONS

This application is a National Stage of International Application No. PCT/JP2011/065475 filed Jul. 6, 2011, the contents of all of which are incorporated herein by reference in their entirety.

TECHNICAL FIELD

The present invention relates to an image processing device, an image processing method and an image processing program.

BACKGROUND ART

Conventionally, as an image processing device, a device is known that processes an image generated with a CMOS (complementary metal oxide semiconductor) under a focal plane shutter system (see patent literature 1). Under the system mentioned above, data on a frame image is transferred line by line. Hence, imaging timing within the frame image slightly differs from line to line. Variations in imaging timing described above cause the so-called rolling shutter distortion (focal plane distortion) to be generated.

In the image processing device disclosed in patent literature 1, a camera motion component, a rolling shutter distortion component and the like are used to model a global motion vector indicating the movement of the entire image. Then, this image processing device detects the global motion vector, separates, with the model described above, individual components from the detected global motion vector and calculates the camera motion component or the rolling shutter distortion component.

CITATION LIST

Patent Literature

[Patent literature 1] Japanese Unexamined Patent Application Publication No. 2010-193302

SUMMARY OF INVENTION

Technical Problem

However, in the image processing device disclosed in patent literature 1, there is a case that the rolling shutter distortion component may not be accurately calculated. For example, when a plurality of subjects having different movements are present within an imaging scene, the movements of the subjects may reflect a global motion vector. In this case, since an error is generated between the global motion vector and the model disclosed in patent literature 1, an error is generated in the obtained rolling shutter distortion component. Furthermore, in the model disclosed in patent literature 1, in order to calculate a component indicating the enlargement and reduction of the rolling shutter distortion, and a component indicating the degree of distortion of a parallelogram, a plurality of components of the global motion vector are needed. Hence, it is more likely that an error is generated in the calculation of the rolling shutter distortion component.

Therefore, in the technical field discussed above, it is required to provide an image processing device, an image processing method and an image processing program that can stably and accurately estimate the rolling shutter distortion component.

Solution to Problem

An image processing device according to one aspect of the present invention is a device that processes an image. The image processing device includes an image input portion, a motion vector acquisition portion and a distortion component estimation portion. The image input portion inputs a target image which is an image to be processed. The motion vector acquisition portion acquires a motion vector generated by relative movement with respect to a subject drawn in the target image when an imaging device which has generated the target image generates the target image. The distortion component estimation portion estimates a rolling shutter distortion component of the target image based on the motion vector.

According to the image processing device described above, a motion vector generated by the movement of the imaging device is acquired, and a rolling shutter distortion component of the target image is estimated based on the motion vector. The motion vector generated by the movement of the imaging device is limited in degree of freedom as compared with a global motion vector indicating the movement of the entire image. Hence, it is possible to stably and accurately acquire, even if an imaging scene is a scene where the subjects having different movements are present together, the motion vector as compared with the global motion vector with the error of the subject being easily removed. Therefore, by using the motion vector generated by the movement of the imaging device, it is possible to stably and accurately estimate the rolling shutter distortion component.

Here, the distortion component estimation portion may estimate the rolling shutter distortion component of the target image based on a parallel movement component of the motion vector. With the configuration described above, by using the parallel movement component, which can be acquired particularly stably and accurately in the motion vectors, it is possible to further stably and accurately estimate the rolling shutter distortion component.

The distortion component estimation portion may estimate the rolling shutter distortion component based on the motion vector and a setting value of an imaging condition of the imaging device. With the configuration described above, it is possible to estimate the rolling shutter distortion component with consideration given to factors specific to the imaging device and environmental information of imaging. Hence, it is possible to accurately estimate the rolling shutter distortion component.

The motion vector acquisition portion may be configured to be able to refer to a recording portion which stores a last image that was generated immediately before the target image, and may acquire the motion vector based on the last image stored in the recording portion and the target image. Alternatively, the motion vector acquisition portion may acquire the motion vector detected by a gyro sensor included in the imaging device.

There may be further provided a correction portion that corrects the target image based on the rolling shutter distortion component. With the configuration described above, it is possible to image the subject with the distortion being reduced.

In addition, the correction portion may be configured to be able to refer to the recording portion which stores a last history of the rolling shutter distortion component, and may adjust the rolling shutter distortion component in the target image so that, when a difference between the last rolling shutter distortion component stored in the recording portion and the rolling shutter distortion component in the target image is larger than a predetermined value, the difference is reduced. With the configuration described above, it is possible to detect a change larger than the predetermined value of the rolling shutter distortion component and to adjust the rolling shutter distortion component so as to reduce the change. Thus, it is possible to prevent the image from being unnaturally corrected even in a scene, for example, where the subject enters or exits an image plane.

The motion vector acquisition portion may be configured to be able to refer to the recording portion which stores the motion vector, and, and may adjust the motion vector of the target image so that, when a difference between the last motion vector stored in the recording portion and the motion vector of the target image is larger than a predetermined value, the difference is reduced. With the configuration described above, it is possible to detect a change larger than the predetermined value of the rolling shutter distortion component and to adjust the rolling shutter distortion component so as to reduce the change. Thus, for example, it is possible to prevent the image from being unnaturally corrected even in the scene where the subject enters or exits the image plane.

The image processing method according to another aspect of the present invention is a method of processing an image. The image processing method includes an image input step, a motion vector acquisition step and a distortion component estimation step. In the image input step, a target image which is an image to be processed is input. In the motion vector acquisition step, a motion vector generated by relative movement with respect to a subject drawn in the target image when an imaging device which has generated the target image generates the target image is acquired. In the distortion component estimation step, a rolling shutter distortion component of the target image is estimated based on the motion vector.

An image processing program according to another aspect of the present invention is a program that causes a computer to operate to process an image. The image processing program causes the computer to operate as an image input portion, a motion vector acquisition portion and a distortion component estimation portion. The image input portion inputs a target image which is an image to be processed. The motion vector acquisition portion acquires a motion vector generated by relative movement with respect to a subject drawn in the target image when an imaging device which has generated the target image generates the target image. The distortion component estimation portion estimates a rolling shutter distortion component of the target image based on the motion vector.

According to the image processing method and the image processing program of the other aspects of the present invention, the same effects as the image processing device described above are acquired.

Advantageous Effects of Invention

According to various aspects and embodiments of the present invention, an image processing device, an image processing method and an image processing program are provided that can stably and accurately estimate the rolling shutter distortion component.

BRIEF DESCRIPTION OF DRAWINGS

FIG. 4A shows the distortion of a subject when the scanning order of line scanning in an X direction is a Y direction and the camera operation is in the X direction; FIG. 4B shows the distortion of the subject when the scanning order of the line scanning in the X direction is the Y direction and the camera operation is in the Y direction; FIG. 4C shows the distortion of the subject when the scanning order of the line scanning in the Y direction is the X direction and the camera operation is in the X direction; FIG. 4D shows the distortion of the subject when the scanning order of the line scanning in the Y direction is the X direction and the camera operation is in the Y direction;

DESCRIPTION OF EMBODIMENTS

Figure 1:
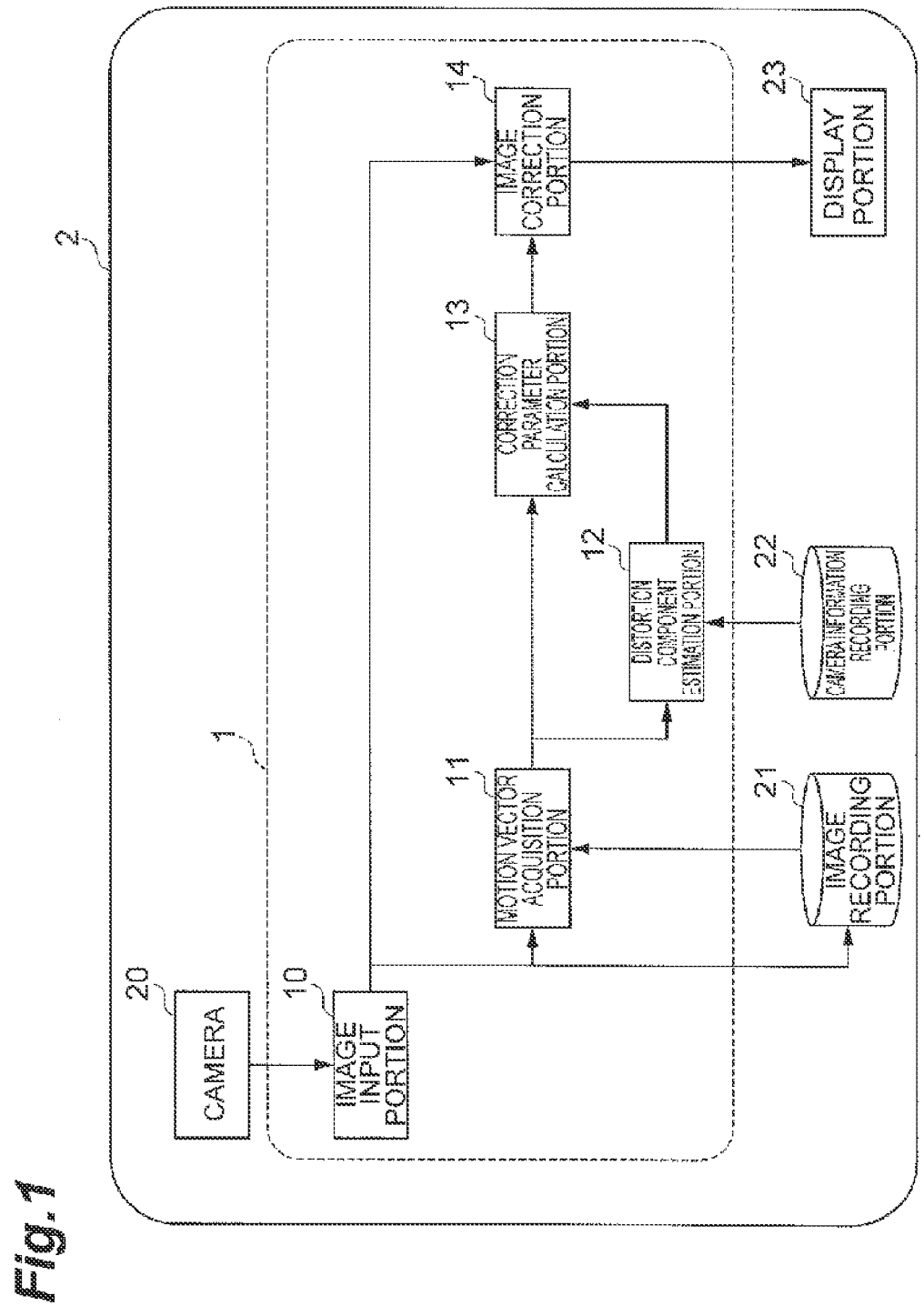
FIG. 1 is a functional block diagram of a mobile terminal incorporating an image processing device according to a first embodiment.

Embodiments of the present invention will be described below with reference to the accompanying drawings. In the drawings, the same reference numerals are given to the same or corresponding components and duplicated explanation will be omitted.

(First embodiment) An image processing device of the present embodiment is a device that corrects the distortion of an image. For example, this image processing device is employed when a correction is made to rolling shutter distortion produced by generating an image while an imaging device is being moved. Although the image processing device of the present embodiment is desirably incorporated in a mobile terminal with limited resources, such as a mobile telephone, a digital camera or a PDA (personal digital assistant), the application is not limited thereto. The image processing device may be incorporated in, for example, a general computer system. For ease of understanding of description, as an example of the image processing device of the present invention, an image processing device that is incorporated in a mobile terminal having a camera feature will be described below.

Figure 2:
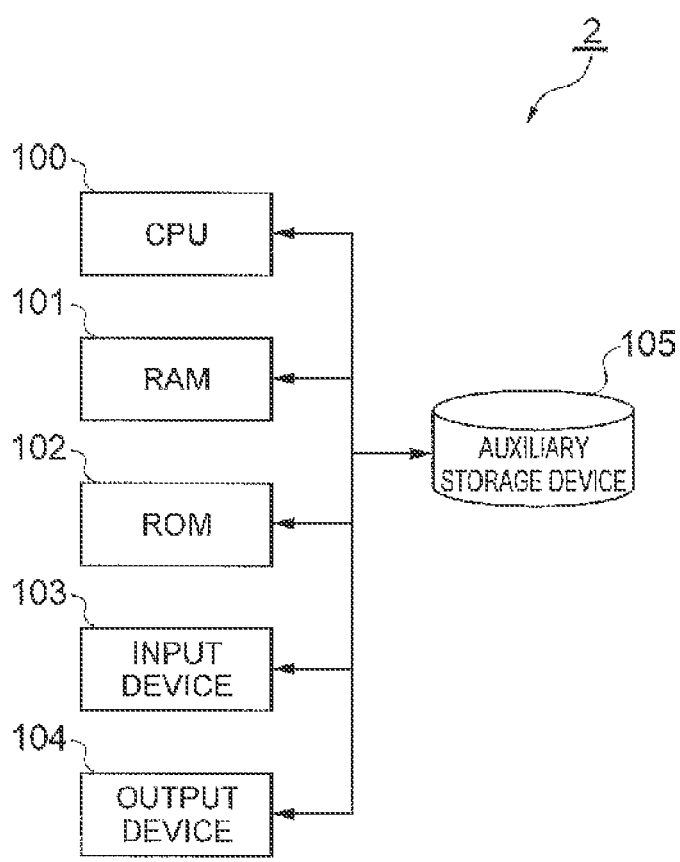
FIG. 2 is a hardware configuration diagram of the mobile terminal incorporating the image processing device of FIG. 1.

FIG. 1 is a functional block diagram of the mobile terminal 2 incorporating the image processing device 1 of the present embodiment. The mobile terminal 2 shown in FIG. 1 is, for example, a mobile terminal that is carried by a user, and has a hardware configuration shown in FIG. 2. FIG. 2 is a hardware configuration diagram of the mobile terminal 2. As shown in FIG. 2, the mobile terminal 2 is physically configured as a general computer system that includes a main storage device such as a CPU (central processing unit) 100, a ROM (read only memory) 101 and a RAM (random access memory) 102, an input device 103 such as a camera and a keyboard, an output device 104 such as a display and an auxiliary storage device 105 such as a hard disk. The individual functions of the mobile terminal 2 and the image processing device 1, which will be described later, are realized by: predetermined computer software is read on hardware such as the CPU 100, the ROM 101 and the RAM 102, and thus the input device 103 and the output device 104 are operated under control of the CPU 100, and data is read and written in the main storage device and the auxiliary storage device 105. Although the description above has been given of the hardware configuration of the mobile terminal 2, the image processing device 1 may be configured as a general computer system that includes the main storage device such as the CPU 100, the ROM 101 and the RAM 102, the input device 103, the output device 104 and the auxiliary storage device 105. The mobile terminal 2 may include a communication module and the like.

As shown in FIG. 1, the mobile terminal 2 includes a camera 20, the image processing device 1, an image recording portion 21, a camera information recording portion 22 and a display portion 23. The camera 20 has a function of generating an image. As the camera 20, for example, a CMOS image sensor is used, and an image is generated under a focal plane shutter system. Specifically, the camera 20 inputs pixel values by performing scanning in a vertical direction or in a horizontal direction of the image. The camera 20 has the successive imaging function of generating the image repeatedly at predetermined intervals starting from the timing indicated by, for example, user operation. In other words, the camera 20 has a function of acquiring not only a still image (a still frame image) but also a moving image (successive moving frame images). For example, the camera 20 has a function of outputting, at each time a frame image (a target image) is generated, the generated frame image to the image processing device 1.

The image processing device 1 includes an image input portion 10, a motion vector acquisition portion 11, a distortion component estimation portion 12, a correction parameter calculation portion 13 and an image correction portion 14.

The image input portion 10 has a function of inputting the frame image generated by the camera 20. For example, the image input portion 10 has a function of inputting, at each time the frame image is generated by the camera 20, the generated frame image. The image input portion 10 also has a function of storing the input frame image in the image recording portion 21 included in the mobile terminal 2. The image input portion 10 also has a function of outputting the input frame image to the motion vector acquisition portion 11 and the image correction portion 14.

Figure 3:
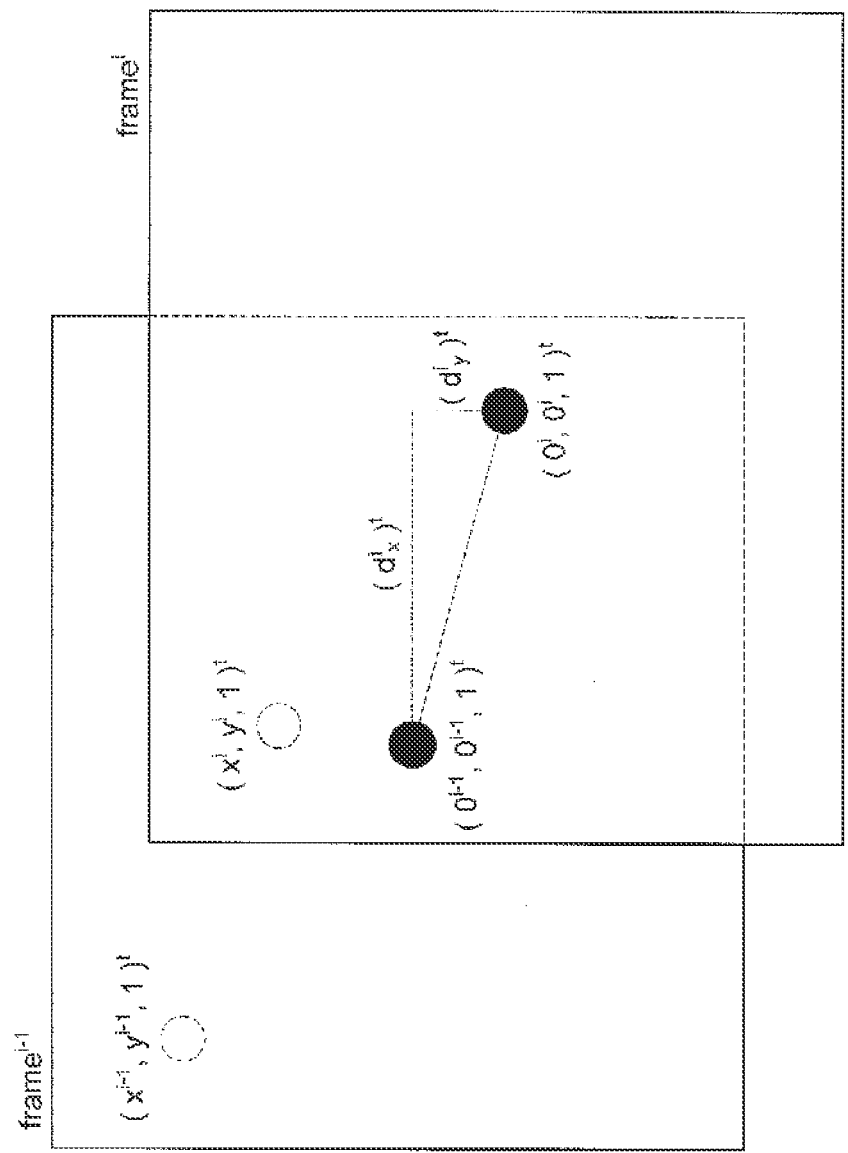
FIG. 3 is a schematic diagram illustrating the coordinate system of two successive frame images.

The motion vector acquisition portion 11 has a function of acquiring a motion vector using the input frame image and two frame images that have been generated immediately before the input frame image. For example, the motion vector acquisition portion 11 references the image recording portion 21 to acquire the frame images immediately before the input frame image. The motion vector acquisition portion 11 matches the successive frame images on an individual block basis to acquire a local motion vector. Then, the motion vector acquisition portion 11 uses the plurality of local motion vectors acquired, to calculates a camera motion component between the frames produced by the movement of the camera 20 relative to a subject. Here, as shown in FIG. 3, when it is assumed that the center of the image is an origin, and that the coordinate system of a frame image to be calculated is $(x^i, y^i, 1)^t$ and the coordinate system of a frame image preceding the frame image is $(x^{i-1}, y^{i-1}, 1)^t$, the component of the camera motion is expressed by formula (1) below. Here, i is a natural number.

$$\begin{pmatrix} x^i \\ y^i \\ 1 \end{pmatrix} = \begin{pmatrix} m_{00}^{i-1 \to i} & m_{01}^{i-1 \to i} & m_{02}^{i-1 \to i} \\ m_{10}^{i-1 \to i} & m_{11}^{i-1 \to i} & m_{12}^{i-1 \to i} \\ 0 & 0 & 1 \end{pmatrix} \begin{pmatrix} x^{i-1} \\ y^{i-1} \\ 1 \end{pmatrix} \quad (1)$$

The camera motion may be acquired by a method other than formula (1) as long as at least the parallel movement component of the camera 20 is acquired. The motion vector acquisition portion 11 has a function of outputting the camera motion component to the distortion component estimation portion 12 and the correction parameter calculation portion 13.

Figure 4A:
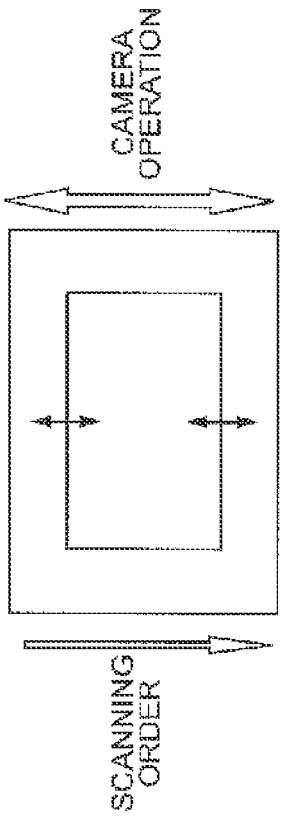
FIGS. 4A to 4D are schematic diagrams illustrating rolling shutter distortion.
Figure 4C:
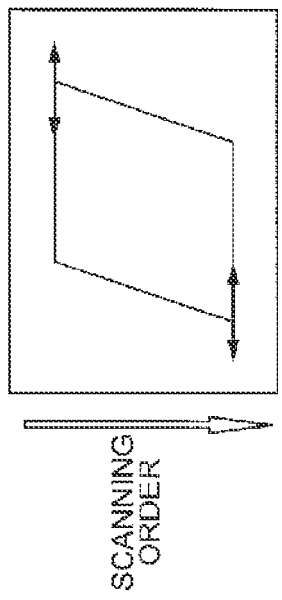
Figure 4B:
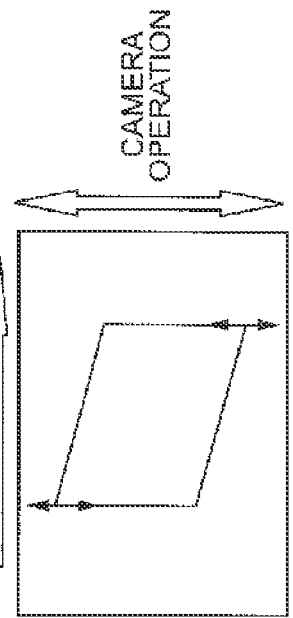

The distortion component estimation portion 12 has a function of estimating the rolling shutter distortion component based on the camera motion component. FIGS. 4A to 4D are schematic diagrams illustrating the rolling shutter distortion. As shown in FIG. 4A, the rolling shutter distortion means that, when the camera 20 moves in a horizontal direction relative to the subject, the subject is distorted in the horizontal direction into a parallelogram. When the camera 20 moves in a vertical direction, as shown in FIG. 4B, the rolling shutter distortion is generated such that the subject is enlarged or reduced in the vertical direction. The amount of distortion is increased as the camera 20 moves faster. Hence, it is possible to estimate the rolling shutter distortion from the speed of the movement of the camera 20. It is possible to estimate the speed of the movement of the camera 20 from the amount of parallel movement between the frames. The distortion component estimation portion 12 inputs the camera motion component acquired by the motion vector acquisition portion 11, assumes that the parallel movement component $(m_{02}^{i-1 \to i}, m_{12}^{i-1 \to i})^t$ of the camera motion component in the vertical and horizontal directions is the amount of parallel movement between the frames $(d_x^i, d_y^i)^t$ and estimates the rolling shutter distortion component based on the amount of parallel movement. The amount of parallel movement between the frames may be employed as the amount of parallel movement of the center coordinates of the frame image. When it is assumed that a distorted coordinate system is $(x^i, y^i, 1)^t$ and a coordinate system without distortion is $(X^i, Y^i, 1)^t$, the rolling shutter distortion component is expressed by formula (2) below.

$$\begin{pmatrix} x^i \\ y^i \\ 1 \end{pmatrix} = \begin{pmatrix} 1 & \alpha \cdot d_x^i & 0 \\ 0 & 1+\alpha \cdot d_y^i & 0 \\ 0 & 0 & 1 \end{pmatrix} \begin{pmatrix} X^i \\ Y^i \\ 1 \end{pmatrix} \quad (2)$$

As shown in formula (2), the value of Y affects the distortion component. Here, α is a distortion coefficient. The distortion coefficient α is a value that is calculated by dividing a time period during which one line of the frame image is read, by a value obtained by adding a time period during which the entire frame image is read to a time period until the successive frame image is read. In other words, the distortion coefficient α is a value that is calculated by dividing the time period during which one line of the frame image is read, by a time period since the first line of the frame image is read until the first line of the successive frame image is read. The distortion coefficient α is changed by the specifications of a pixel sensor included in the camera 20 and the settings of the driving of the pixel sensor. For example, the pixel sensors differ from each other in the setting information such as a scan speed, a frame rate, an exposure time, an image size, the direction of a scanning line, a zoom scaling, an f number, the tuning on/off of a mechanical camera shake correction mechanism, a time period since the generating of the frame until an output is produced, a reading speed, the direction of reading and the like. Hence, it is necessary to previously calculate, before the estimation of the distortion, various settings of the pixel sensor, an imaging mode or the imaging conditions including environmental conditions.

Figure 5:
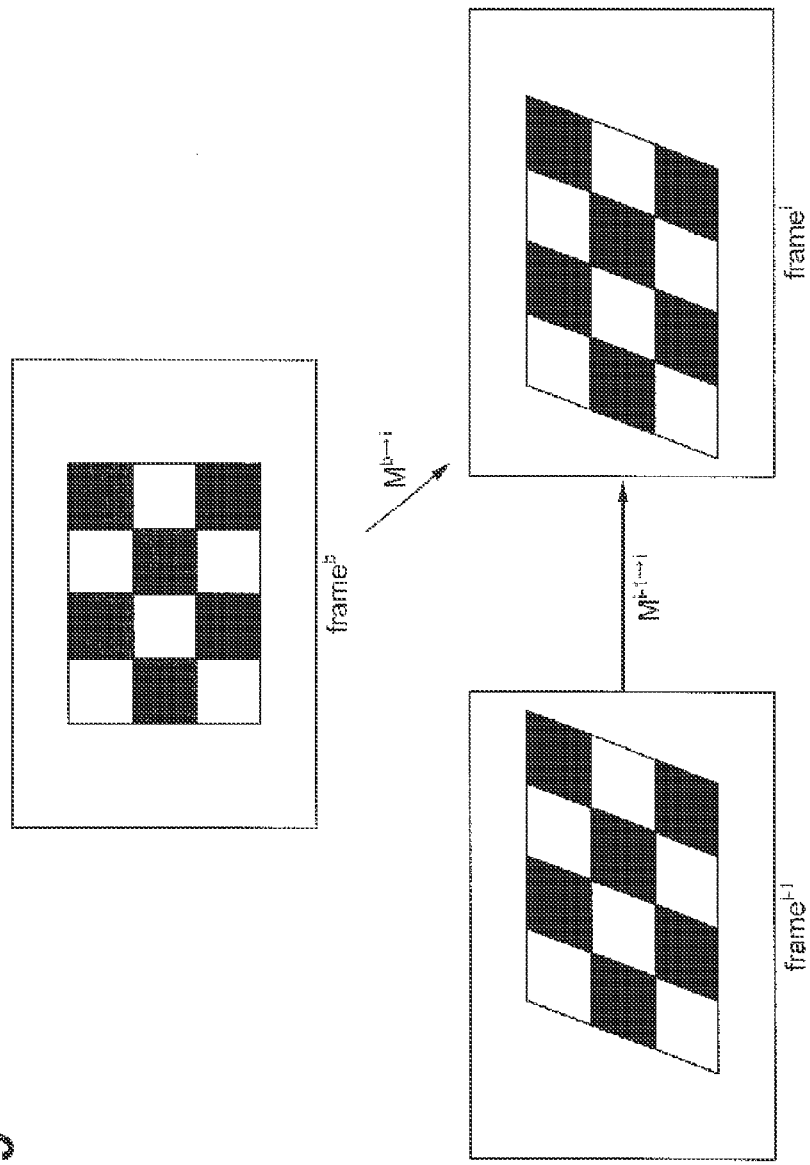
FIG. 5 is a schematic diagram illustrating a method of calculating a distortion coefficient.

A method of calculating the distortion coefficient α will now be described. FIG. 5 is a schematic diagram illustrating the method of calculating the distortion coefficient α. As shown in FIG. 5, the distortion coefficient α is calculated using a still frame image frame$^b$ and a moving frame image sequence frame$^i$. The still frame image and the moving frame image are compared, and thus how much distortion is produced is determined, and furthermore, how much parallel movement is performed between the moving frame images is determined, with the result that a correlation between the distortion and the amount of parallel movement is determined. The distortion coefficient α is determined from the correlation.

Specifically, the still frame image frame$^b$ is first shot with the subject and the camera 20 at rest. Then, the subject and the camera 20 are moved, and a moving frame image sequence: frame$^0$, frame$^1$, frame$^2$, ..., frame$^{i-1}$ and frame$^i$ are shot. The amount of distortion of the moving frame image frame$^i$ can be calculated by calculating a motion matrix $M^{b \to i}$ from the still frame image frame$^b$ to the moving frame image frame$^i$. When it is assumed that the coordinate system of the still frame image frame$^b$ is $(x^b, y^b, 1)$ and that the coordinate system of the moving frame image frame$^i$ is $(x^i, y^i, 1)$, the amount of distortion is expressed by formula (3) below.

$$\begin{pmatrix} x^i \\ y^i \\ 1 \end{pmatrix} = \begin{pmatrix} m^{b \to i}_{00} & m^{b \to i}_{01} & m^{b \to i}_{02} \\ m^{b \to i}_{10} & m^{b \to i}_{11} & m^{b \to i}_{12} \\ 0 & 0 & 1 \end{pmatrix} \begin{pmatrix} x^b \\ y^b \\ 1 \end{pmatrix} \quad (3)$$

Here, when it is assumed that the motion matrix $M^{b \to i}$ is formed with only the parallel movement component and the distortion component, the amount of distortion can be approximated by formula (4) below.

$$\begin{pmatrix} x^i \\ y^i \\ 1 \end{pmatrix} = \begin{pmatrix} 1 & m^{b \to i}_{01} & m^{b \to i}_{02} \\ 0 & m^{b \to i}_{11} & m^{b \to i}_{12} \\ 0 & 0 & 1 \end{pmatrix} \begin{pmatrix} x^b \\ y^b \\ 1 \end{pmatrix} \quad (4)$$

Formula (2) and formula (4) are compared. In formula (4), the distortion component is $m^{b \to i}_{01}$ and $m^{b \to i}_{11}$. On the other hand, in formula (2), the distortion component is based on the amount of parallel movement $(d_x^i, d_y^i)^t$ that is the movement component between the successive frames. In order to determine the amount of parallel movement, the motion matrix $M^{i-1 \to i}$ is determined from the moving frame image frame$^i$ and the preceding moving frame image frame$^{i-1}$. A relationship between the moving frame image frame$^i$ and the preceding moving frame image frame$^{i-1}$ can be expressed by formula (5) below.

$$\begin{pmatrix} x^i \\ y^i \\ 1 \end{pmatrix} = \begin{pmatrix} m^{i-1 \to i}_{00} & m^{i-1 \to i}_{01} & m^{i-1 \to i}_{02} \\ m^{i-1 \to i}_{10} & m^{i-1 \to i}_{11} & m^{i-1 \to i}_{12} \\ 0 & 0 & 1 \end{pmatrix} \begin{pmatrix} x^{i-1} \\ y^{i-1} \\ 1 \end{pmatrix} \quad (5)$$

The movement component between the frames $(m_{02}^{i-1 \to i}, m_{12}^{i-1 \to i})^t$ may be set at the parallel movement component $(d_x^i, d_y^i)^t$ using formula (5). The amount of parallel movement of the center coordinates of the moving frame image frame$^i$ may be set at $(d_x^i, d_y^i)^t$. The calculation of $(d_x^i, d_y^i)^t$ allows the distortion coefficient α to be expressed by formulas (6) and (7) below.

$$\alpha = \frac{m^{b \to i}_{01}}{d_x^i} \quad (6)$$

$$\alpha = \frac{m^{b \to i}_{11} - 1}{d_y^i} \quad (7)$$

Figure 6:
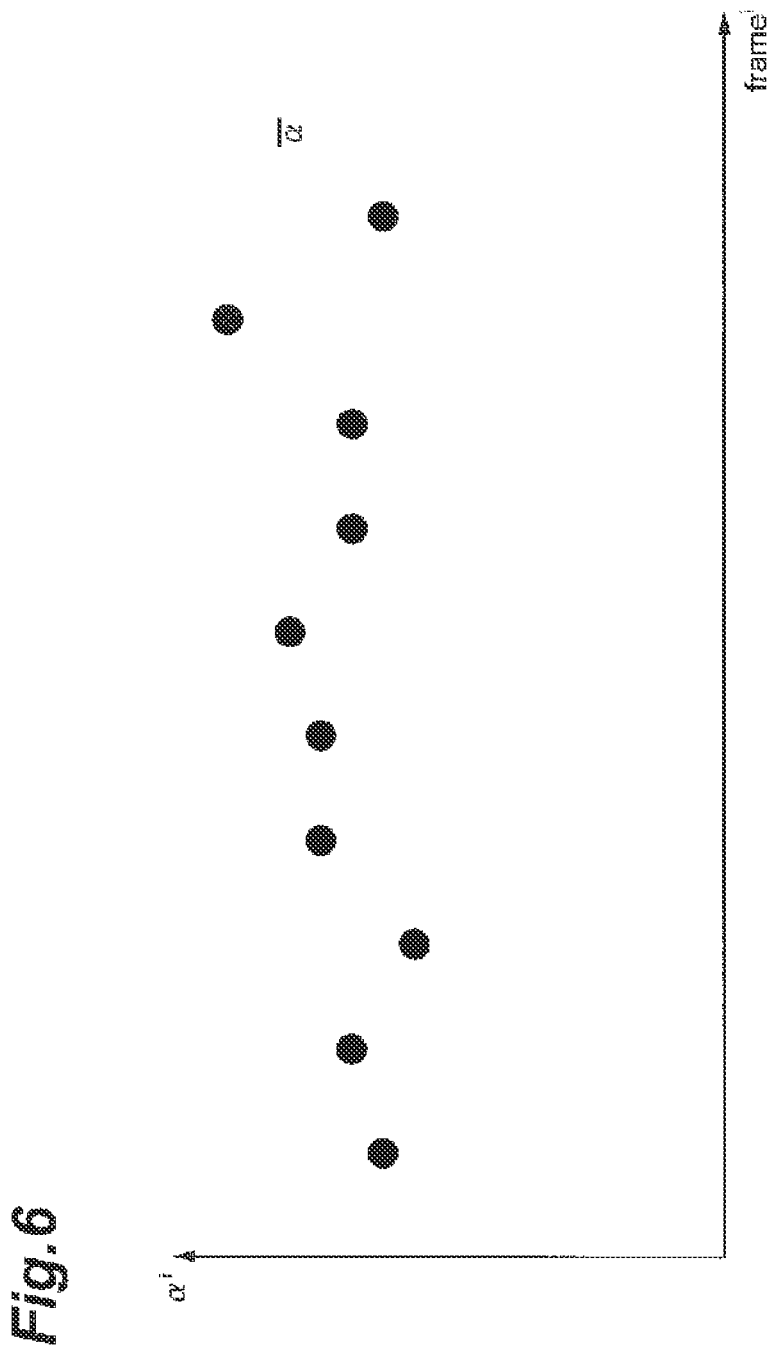
FIG. 6 is a graph showing a relationship between a moving frame image and the distortion coefficient.
Figure 7:
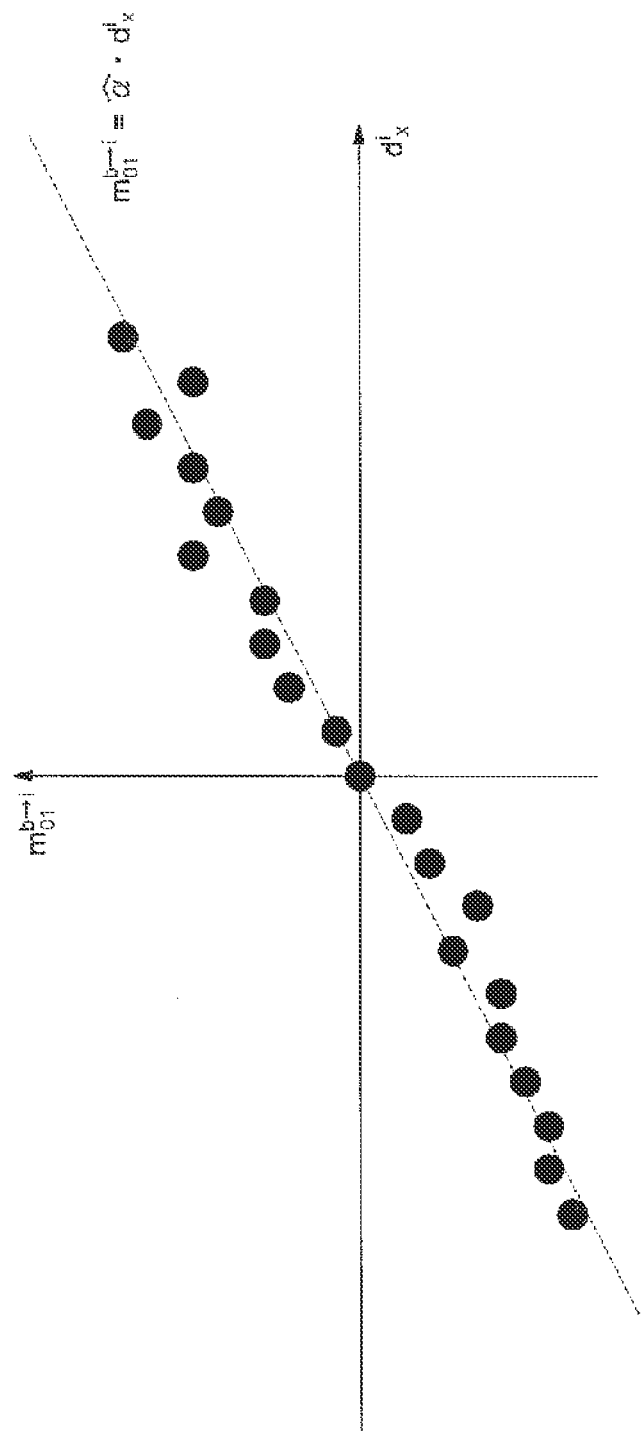
FIG. 7 is a graph showing a relationship between a motion matrix component and the amount of movement.

It is considered that the measurement values $m_{01}^{b \to i}$, $m_{11}^{b \to i}$, $d_x^i$ and $d_y^i$ used for determining the distortion coefficient α can include an error. In FIG. 6, the horizontal axis is the frame$^i$ and the vertical axis is the distortion coefficient $\alpha^i$. As shown in FIG. 6, the distortion coefficients $\alpha^i$ are determined on various frame$^i$s, and the average value of these coefficients may be employed as the distortion coefficient α. In FIG. 7, the horizontal axis is the amount of movement $d_x^i$ and the vertical axis is the motion matrix component $m_{01}^{b \to i}$. As shown in FIG. 7, by plotting the distortion coefficients $\alpha^i$ on a two-dimensional plane, and the distortion coefficient α may be determined from the gradient of a regression line indicated by formula (7). Even if the measurement values $m_{01}^{b \to i}$, $m_{11}^{b \to i}$, $d_x^i$ and $d_y^i$ are low, and the error greatly affects the distortion coefficient α, the distortion coefficient α can be accurately determined by the method described above. How the rolling shutter distortion is produced differs depending on the specifications of the pixel sensor and the settings of the driving of the pixel sensors. By the method described above, the distortion coefficient α is calculated for each of the settings of the camera 20, that is, the pixel sensors, and thus it is possible to accurately estimate the rolling shutter distortion, reflecting the conditions specific to the camera 20. When the distortion coefficient α is calculated using actual measurement values, under what kind of imaging environmental conditions the distortion coefficient α is calculated may be recorded. The imaging environmental conditions include, for example, "brightness" and "temperature."

The distortion component estimation portion 12 is configured to be able to refer to the camera information recording portion 22. The camera information recording portion 22 records the distortion coefficient α calculated by the method described above. For example, the camera information recording portion 22 has a table that associates an element setting value with the distortion coefficient α. The camera information recording portion 22 may have a table that associates the element setting value and the imaging environment with the distortion coefficient α. The distortion component estimation portion 12 references the camera information recording portion 22 to acquire the value of the distortion coefficient α according to the settings of the pixel sensor, and uses the camera motion component to estimate the rolling shutter distortion component. Information regarding the current settings of the pixel sensor and information regarding the imaging environment may be acquired from, for example, the camera 20. When a time period during which one line of the frame image is read and a time period since the entire frame image is read until the successive frame image is read are recorded in the camera information recording portion 22 so as to be associated with the setting information and the information regarding the imaging environment, instead of acquiring the distortion coefficient α directly from the camera information recording portion 22, the distortion coefficient α may be calculated based on the information recorded in the camera information recording portion 22. The distortion component estimation portion 12 has a function of outputting the rolling shutter distortion component to the correction parameter calculation portion 13.

The correction parameter calculation portion 13 has a function of calculating a correction parameter for cancelling out the distortion based on the camera motion component and the rolling shutter distortion component. For example, the correction parameter calculation portion 13 calculates parameters for moving image camera shake correction and rolling shutter distortion correction. Here, the correction parameter for the moving image camera shake correction is calculated as follows.

First, the accumulative value of the camera motion component from the frame that is the reference of the stationary position of the camera 20 is determined. Then, for example, based on the accumulative value of the camera motion component, only the frequency of the camera shake is extracted. The correction parameter is calculated so as to cancel out the frequency. When the moving image camera shake correction is performed, when coordinates before the movement correction and coordinates after the movement correction are respectively represented by $(x^b, y^b, 1)^t$ and $(x^{ii}, y^{ii}, 1)^t$, the moving image movement correction is expressed by formula (8) below.

$$\begin{pmatrix} x^i \\ y^i \\ 1 \end{pmatrix} = \begin{pmatrix} m'^{b \to i}_{00} & m'^{b \to i}_{01} & m'^{b \to i}_{02} \\ m'^{b \to i}_{10} & m'^{b \to i}_{11} & m'^{b \to i}_{12} \\ 0 & 0 & 1 \end{pmatrix} \begin{pmatrix} x^{ii} \\ y^{ii} \\ 1 \end{pmatrix} \quad (8)$$

Here, the following matrix using formula (8) is a movement correction matrix.

$$\begin{pmatrix} m'^{b \to i}_{00} & m'^{b \to i}_{01} & m'^{b \to i}_{02} \\ m'^{b \to i}_{10} & m'^{b \to i}_{11} & m'^{b \to i}_{12} \\ 0 & 0 & 1 \end{pmatrix}$$

The coordinates before the movement correction $(x^b, y^b, 1)^t$ are a coordinate system with distortion. Here, the coordinates before the movement correction $(x^b, y^b, 1)^t$ are temporarily converted into a non-distorted coordinate system $(x^b, y^b, 1)^t$, and then the correction by the same movement correction matrix is applied. In this case, the amount of distortion is represented as shown in formula (9) below.

$$\begin{pmatrix} X^i \\ Y^i \\ 1 \end{pmatrix} = \begin{pmatrix} m'^{b \to i}_{00} & m'^{b \to i}_{01} & m'^{b \to i}_{02} \\ m'^{b \to i}_{10} & m'^{b \to i}_{11} & m'^{b \to i}_{12} \\ 0 & 0 & 1 \end{pmatrix} \begin{pmatrix} x^{ii} \\ y^{ii} \\ 1 \end{pmatrix} \quad (9)$$

Formula (2) is substituted into formula (9), and thus calculation can be performed as shown in formula (10) below.

$$\begin{pmatrix} 1 & \alpha \cdot d^i_x & 0 \\ 0 & 1+\alpha \cdot d^i_y & 0 \\ 0 & 0 & 1 \end{pmatrix}^{-1} \begin{pmatrix} x^i \\ y^i \\ 1 \end{pmatrix} = \begin{pmatrix} m'^{b \to i}_{00} & m'^{b \to i}_{01} & m'^{b \to i}_{02} \\ m'^{b \to i}_{10} & m'^{b \to i}_{11} & m'^{b \to i}_{12} \\ 0 & 0 & 1 \end{pmatrix} \begin{pmatrix} x^{ii} \\ y^{ii} \\ 1 \end{pmatrix} \quad (10)$$

$$\begin{pmatrix} x^i \\ y^i \\ 1 \end{pmatrix} = \begin{pmatrix} 1 & \alpha \cdot d^i_x & 0 \\ 0 & 1+\alpha \cdot d^i_y & 0 \\ 0 & 0 & 1 \end{pmatrix} \begin{pmatrix} m'^{b \to i}_{00} & m'^{b \to i}_{01} & m'^{b \to i}_{02} \\ m'^{b \to i}_{10} & m'^{b \to i}_{11} & m'^{b \to i}_{12} \\ 0 & 0 & 1 \end{pmatrix} \begin{pmatrix} x^{ii} \\ y^{ii} \\ 1 \end{pmatrix}$$

$$= \begin{pmatrix} m'^{b \to i}_{00} + m'^{b \to i}_{10} \cdot \alpha \cdot d^i_x & m'^{b \to i}_{01} + m'^{b \to i}_{11} \cdot \alpha \cdot d^i_x & m'^{b \to i}_{02} + m'^{b \to i}_{12} \cdot \alpha \cdot d^i_x \\ m'^{b \to i}_{10} + m'^{b \to i}_{10} \cdot \alpha \cdot d^i_y & m'^{b \to i}_{11} + m'^{b \to i}_{11} \cdot \alpha \cdot d^i_y & m'^{b \to i}_{12} + m'^{b \to i}_{12} \cdot \alpha \cdot d^i_y \\ 0 & 0 & 1 \end{pmatrix} \begin{pmatrix} x^{ii} \\ y^{ii} \\ 1 \end{pmatrix}$$

Formula (10) above is a model formula that is used for performing the distortion correction and the moving image camera shake correction at the same time. Here, it is necessary to bias a parallel movement component ($m_{02}^{'b \to i} + m_{12}^{'b \to i} \cdot \alpha \cdot d^i_x$, $m_{12}^{b \to i} \cdot \alpha \cdot d^i_y)^t$ in formula (10) above, depending on the position of the origin of the distortion coefficient α.

As described above, the correction parameter calculation portion 13 determines the movement correction matrix based on the camera motion component, and then performs the calculation represented by formula (10) based on the movement correction matrix and the rolling shutter distortion and thereby calculates the parameters for the moving image camera shake correction and the rolling shutter distortion. The correction parameter calculation portion 13 has a function of outputting the parameters to the image correction portion 14.

The image correction portion 14 has a function of performing movement correction on the input frame image based on the moving image camera shake correction and the rolling shutter distortion correction. For example, the image correction portion 14 performs, based on the parameter, on the frame image, image deformation and pixel interpolation by affine transformation or the like. The image correction portion 14 is capable of applying the correction such as parallel movement, rotation, enlargement, reduction or the like between the frame images caused by the camera shake and the rolling shutter distortion. Then, the image correction portion 14 selects a target of the correction, as necessary, and performs image correction. As described above, in the image processing device 1 of the present embodiment, the rolling shutter distortion is limited such that it is caused only by the parallel movement component of the camera motion. Here, when the camera shake is also limited to the parallel movement, it is possible to perform image correction by line-copying, from the frame image before the correction, a necessary region for a horizontal line at a position corresponding to each horizontal line of the correction frame image. In this way, it is possible to perform image correction at high speed. The image correction portion 14 has a function of outputting, to the display portion 23, the correction frame image on which the camera shake and rolling shutter distortion corrections have been performed. The display portion 23 has a function of displaying the correction frame image.

Figure 8:
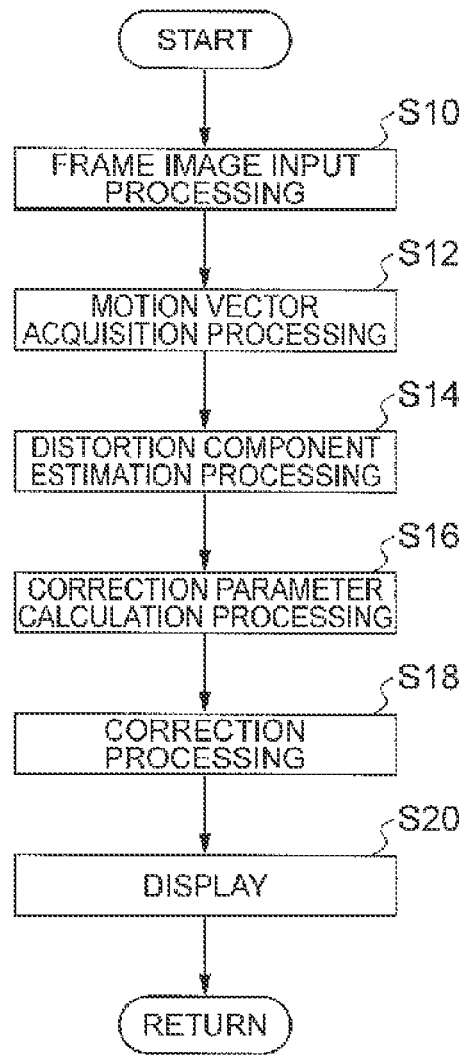
FIG. 8 is a flowchart showing the operation of the image processing device of FIG. 1.

The operation of the image processing device 1 according to the present embodiment will now be described. FIG. 8 is a flowchart showing the operation of the image processing device 1 according to the present embodiment. The control processing shown in FIG. 8 is performed, for example, when the imaging function of the mobile terminal 2 is turned on, and is repeated at predetermined intervals.

As shown in FIG. 8, the image input portion 10 first inputs a frame image to be processed (S10; an image input step). Then, the motion vector acquisition portion 11 acquires a motion vector (S12; a parallel movement amount acquisition step). The motion vector acquisition portion 11 references the image recording portion 21, acquires the motion vector based on the frame image (the most recent preceding image) that was input immediately before and the frame image input in the processing of S10 and assumes that the motion vector is the camera motion component. After the completion of the processing of S12, the process moves on to distortion component estimation processing (S14, a distortion component estimation step).

In the processing of S14, the distortion component estimation portion 12 uses the camera motion component acquired in the processing of S12, and thereby estimates the rolling shutter distortion component. For example, the distortion component estimation portion 12 references the camera information recording portion 22, and acquires the value of the distortion coefficient $\alpha$ according to the settings of the pixel sensors. Then, the distortion component estimation portion 12 uses the distortion coefficient $\alpha$ and the camera motion component, and thereby estimates the rolling shutter distortion component based on formula (2). After the completion of the processing of S14, the process moves on to correction parameter calculation processing (S16).

In the processing of S16, the correction parameter calculation portion 13 uses the distortion component estimated in the processing of S14, and thereby calculates the correction parameter. For example, the correction parameter calculation portion 13 uses formula (10) to calculate the correction parameter. After the completion of the processing of S16, the process moves on to correction processing (S18).

In the processing of S18, the image correction portion 14 uses the correction parameter calculated in the processing of S16, and thereby corrects the frame image. After the completion of the processing of S18, the process moves on to display processing (S20).

In the processing of S20, the display portion 23 displays the frame image corrected in the processing of S18. After the completion of the processing of S20, the control processing shown in FIG. 8 is completed.

An image processing program for making the mobile terminal (computer) 2 function as the image processing device 1 will now be described.

The image processing program includes a main module, an input module and a computation processing module. The main module is a portion that comprehensively controls the image processing. The input module operates the mobile terminal 2 so as to acquire the input image. The computation processing module includes a motion vector acquisition module, a distortion component estimation module, a correction parameter calculation module and an image correction module. The functions that are achieved by performing the main module, the input module and the computation processing module are respectively the same as those of the image input portion 10, the motion vector acquisition portion 11, the distortion component estimation portion 12, the correction parameter calculation portion 13 and the image correction portion 14 in the image processing device 1 described above.

The image processing program is provided by, for example, the storage medium such as the ROM or a semiconductor memory. The image processing program may be provided as data signals through a network.

As described above, according to the image processing device 1 of the first embodiment, the motion vector generated by the movement of the camera 20 is acquired, and the rolling shutter distortion component of the frame image is estimated based on the motion vector. The motion vector generated by the movement of the camera 20 is limited in flexibility as compared with a global motion vector indicating the movement of the entire image. For example, although parameters such as a parallel movement component, an enlargement reduction component, a rotational component and a deformation (distortion) component are present in the global motion vector, it is not necessary to consider the parameters of the deformation and the distortion in the movement of the camera 20. Specifically, although it is necessary to detect the affine parameters of six parameters in the global motion vector, according to the image processing device 1, it is only necessary to consider the amounts of parallel movement in the horizontal and vertical directions, that is, two parameters. Hence, it is possible to stably and accurately acquire, even if an imaging scene includes subjects having different movements, the motion vector as compared with the global motion vector with the error of the subjects being easily removed. Therefore, by using the motion vector generated by the movement of the camera 20, it is possible to stably and accurately estimate the rolling shutter distortion component. Furthermore, since the rolling shutter distortion component is estimated by the simple calculation using the two parameters, the processing can be rapidly performed.

According to the image processing device 1 of the first embodiment, the parallel movement component, which can be acquired particularly stably and accurately among the motion vectors, is used, and thus it is possible to further stably and accurately estimate the rolling shutter distortion component.

Furthermore, according to the image processing device 1 of the first embodiment, it is possible to estimate the rolling shutter distortion component with consideration given to factors specific to the camera 20 and environmental information and the like at the time of imaging. Hence, it is possible to accurately estimate the rolling shutter distortion component even if the settings of the camera 20 are changed and how the rolling shutter distortion is produced is changed.

Figure 9:
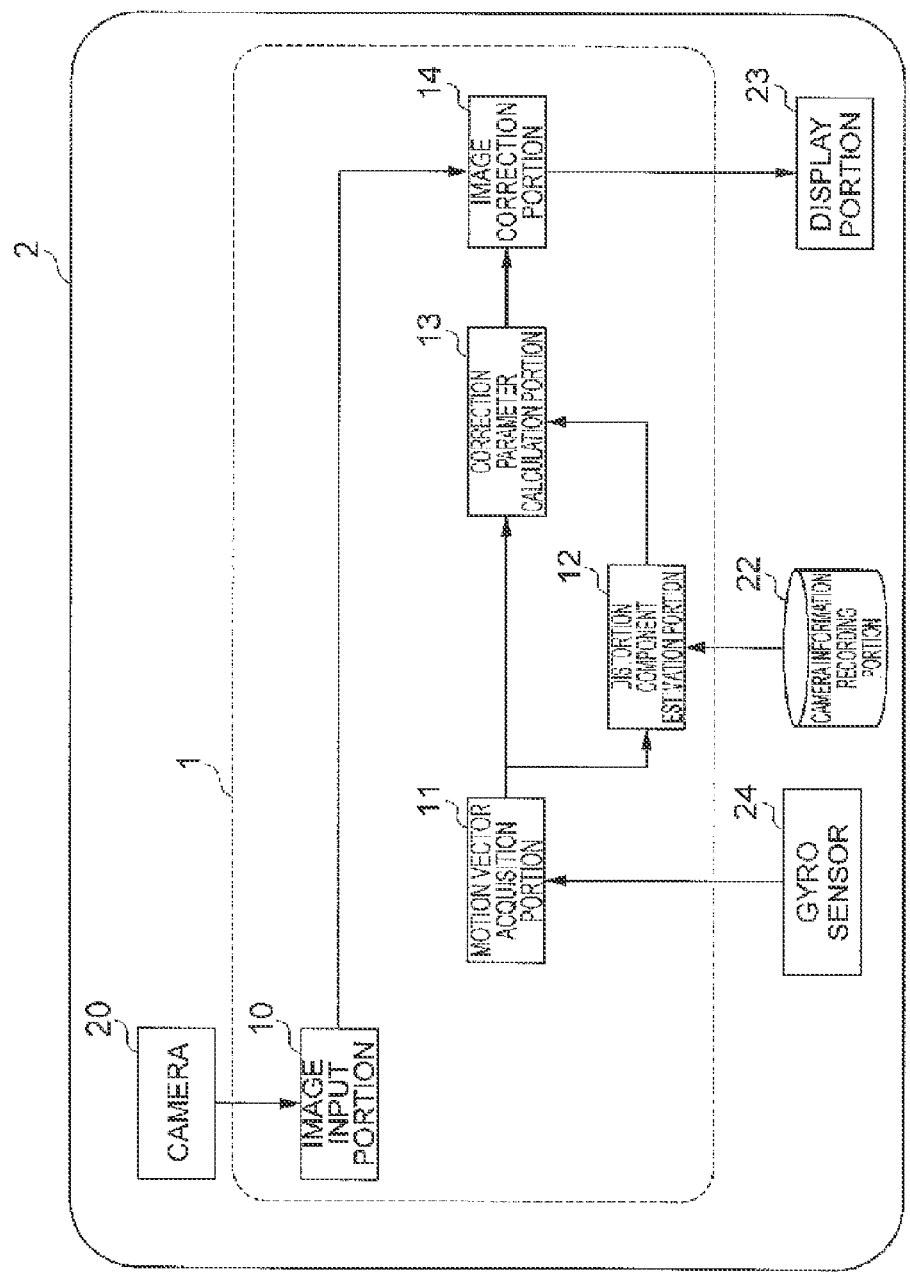
FIG. 9 is a functional block diagram of a mobile terminal incorporating another image processing device according to a first embodiment.

As a variation of the image processing device 1 according to the first embodiment, the rolling shutter distortion component may be estimated by using movement information detected by a gyro sensor. The configuration of the image processing device 1 using a gyro sensor is shown in FIG. 9. As shown in FIG. 9, the motion vector acquisition portion 11 is connected to the gyro sensor 24. The motion vector acquisition portion 11 acquires movement information (the motion vector) output by the gyro sensor 24 as the camera motion. The other configurations are the same. The gyro sensor 24 is used in this way, and thus it is possible to estimate and correct the rolling shutter distortion even if one frame image is to be processed.

Furthermore, the image processing method and the image processing program according to the first embodiment produce the same function effects as the image processing device 1.

(Second embodiment) The image processing device 1 of a second embodiment is configured substantially similar to the image processing device 1 of the first embodiment, and differs in part of the function of the distortion component estimation portion 12. Specifically, the image processing device 1 of the second embodiment differs in that the distortion component estimation portion 12 switches and uses a plurality of models of the rolling shutter distortion components according to the information acquired from the camera 20. In the following description, the different points from the image processing device 1 of the first embodiment will be mainly discussed, and redundant description will not be repeated.

Figure 4D:
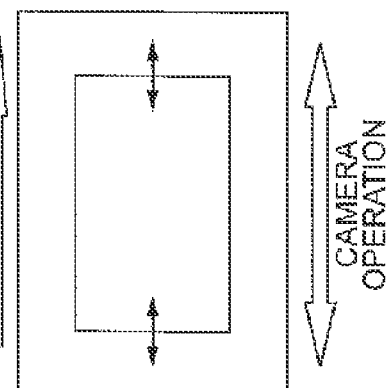

The distortion component estimation portion 12 has a function of changing the method of estimating the rolling shutter distortion component based on information regarding the direction of the scanning order of the pixel sensors of the camera 20. For example, in the camera information recording portion 22, as information regarding the settings of the camera 20, information regarding the direction of the scanning order of the present image sensors is recorded. The distortion component estimation portion 12 references the camera information recording portion 22 to acquire the information above. Depending on the direction of the scanning of the pixel sensors, as shown in FIGS. 4(A), 4(B), 4(C) and 4(D), the rolling shutter distortion components differs in the shape of produced distortion. As shown in FIGS. 4(A) and 4(B), when the scanning order is in the vertical direction, as described in the first embodiment, the rolling shutter distortion can be expressed by the model indicated in formula (2). On the other hand, when the scanning order is in the horizontal direction as shown in FIGS. 4(C) and 4(D), the rolling shutter distortion cannot be expressed by the model indicated in formula (2). In this case, when it is assumed that the distorted coordinate system is $(x^i, y^i, 1)^t$ and the coordinate system without distortion is $(X^i, Y^i, 1)^t$, the rolling shutter distortion component is expressed by the model indicated by formula (11) below.

$$\begin{pmatrix} x^i \\ y^i \\ 1 \end{pmatrix} = \begin{pmatrix} 1 + \alpha \cdot d_x^i & 0 & 0 \\ \alpha \cdot d_y^i & 1 & 0 \\ 0 & 0 & 1 \end{pmatrix} \begin{pmatrix} X^i \\ Y^i \\ 1 \end{pmatrix} \quad (11)$$

As indicated in formula (11) above, the value of X affects the distortion component.

Based on the information regarding the direction of the scanning order of the pixel sensors obtained by referencing the camera information recording portion 22, the distortion component estimation portion 12 determines whether to perform the estimation with formula (2) or formula (11). Then, based on the determined model, the rolling shutter distortion component is estimated. The other configurations are the same as in the first embodiment. The image processing program of the present embodiment is configured similar to the image processing program of the first embodiment.

As described above, according to the image processing device 1 of the second embodiment, the same function effects as the image processing device 1 of the first embodiment are produced, and the rolling shutter distortion can be estimated by using an appropriate model according to the direction of the scanning order of the image sensors. Hence, even if the direction of the scanning order of the image sensors is changed by the settings of the camera 20, it is possible to perform accurate estimation.

(Third embodiment) The image processing device 1 of a third embodiment is configured substantially similar to the image processing device 1 of the first embodiment, and differs in part of the function of the distortion component estimation portion 12. Specifically, the image processing device 1 of the second embodiment differs in that the distortion component estimation portion 12 detects the change of the rolling shutter distortion and that the estimation value is adjusted according to the change. In the following description, the different points from the image processing device 1 of the first embodiment will be mainly discussed, and redundant description will not be repeated.

Figure 10:
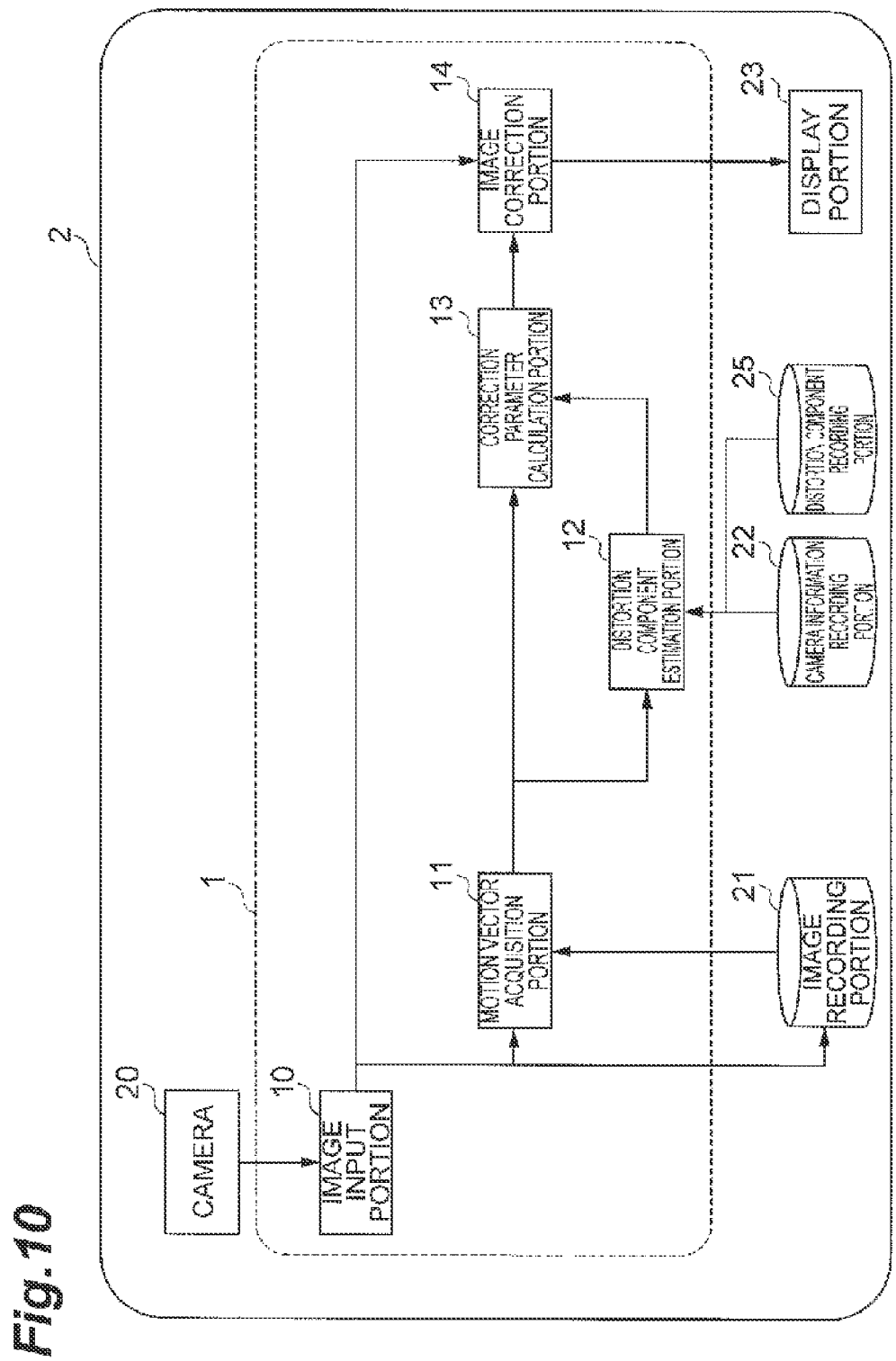
FIG. 10 is a functional block diagram of a mobile terminal incorporating an image processing device according to a third embodiment.

FIG. 10 is a functional block diagram of the mobile terminal 2 incorporating the image processing device 1 of the present embodiment. As shown in FIG. 10, the mobile terminal 2 includes a distortion component recording portion 25. The distortion component recording portion 25 is configured such that reading and writing can be performed from and in the distortion component recording portion 25 by the distortion component estimation portion 12. The distortion component recording portion 25 stores the history of the rolling shutter distortion component estimated by the distortion component estimation portion 12.

The distortion component estimation portion 12 estimates the rolling shutter distortion component, and records it in the distortion component recording portion 25. Then, the distortion component estimation portion 12 determines whether or not the estimated rolling shutter distortion component is rapidly changed as compared with the preceding value stored in the distortion component recording portion 25. The preceding value refers to the estimation value of the rolling shutter distortion that is estimated in the immediately preceding frame image. For example, the distortion component estimation portion 12 calculates a difference between the estimated rolling shutter distortion component and the preceding value, and determines, when the difference value is larger than a first threshold value, that a rapid change occurs. Then, when the distortion component estimation portion 12 determines that a rapid change occurs, the distortion component estimation portion 12 adjusts the estimation value of the rolling shutter distortion component. The distortion component estimation portion 12 performs the adjustment so that the difference is reduced. For example, in the distortion component estimation portion 12, the estimation value of the rolling shutter distortion is set to be the same as the estimation value of the rolling shutter distortion of the preceding frame image. Alternatively, the distortion component estimation portion 12 uses the estimation value of the rolling shutter distortion and the rolling shutter distortion components of the preceding frame images, and thereby performs weighted average. In the distortion component estimation portion 12, the number of rolling shutter distortion components of the preceding frame images selected for performing weighted average is set equal to or less than a second threshold value. By adjusting the second threshold value, it is possible to adjust the degree of reducing the change of the rolling shutter distortion. The other configurations are the same as the image processing device according to the first embodiment. The image processing program of the present embodiment is configured similar to the image processing program of the first embodiment.

Figure 11:
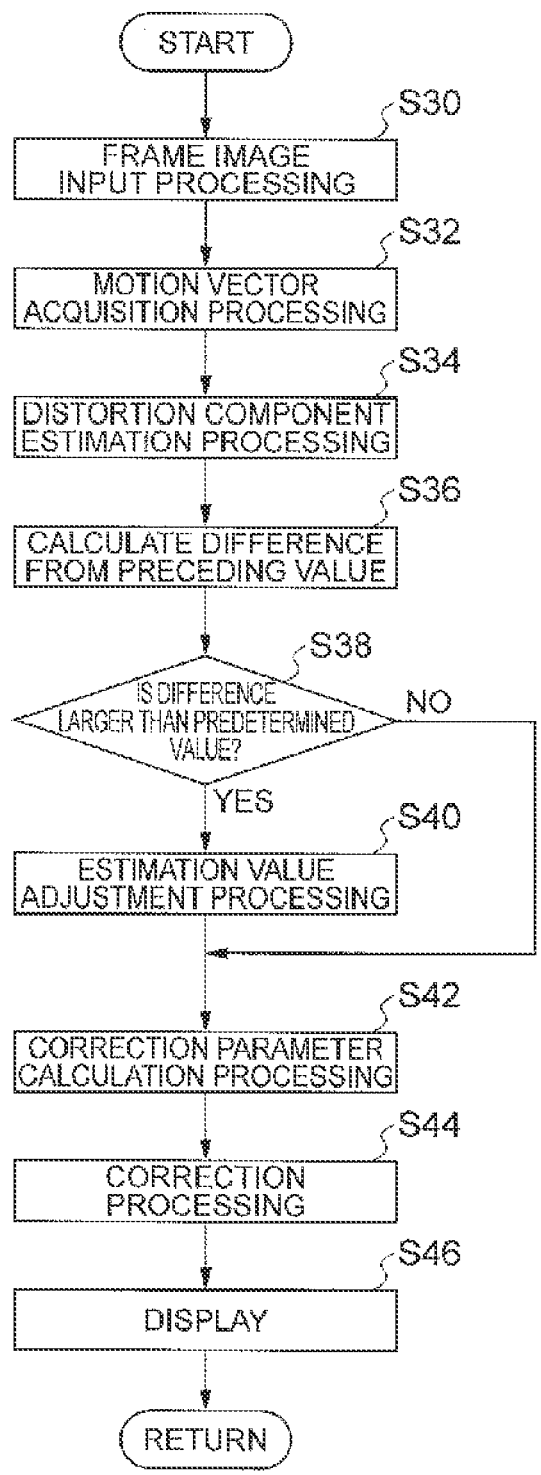
FIG. 11 is a flowchart showing the operation of the image processing device of FIG. 10.

The operation of the image processing device 1 according to the present embodiment will now be described. FIG. 11 is a flowchart showing the operation of the image processing device 1 according to the present embodiment. The control processing shown in FIG. 11 is performed, for example, when the imaging function of the mobile terminal 2 is turned on, and is repeated at predetermined intervals.

Frame image input processing (S30), motion vector acquisition processing (S32) and distortion estimation processing (S34) shown in FIG. 11 are the same as the ones shown in FIG. 8.

In the processing of S36, the distortion component estimation portion 12 references the distortion component recording portion 25, and thereby acquires the rolling shutter distortion component (the preceding value) estimated in the preceding frame image. Then, the distortion component estimation portion 12 calculates a difference between the rolling shutter distortion component calculated in the processing of S34 and the preceding value. After the completion of the processing of S34, the process moves on to difference determination processing (S38).

In the processing of S38, the distortion component estimation portion 12 determines whether or not the difference calculated in the processing of S36 is larger than a predetermined value (a first threshold value). When, in the processing of S38, the difference is determined to be larger than the first threshold value, the process moves on to adjustment processing (S40).

In the processing of S40, the distortion component estimation portion 12 adjusts the rolling shutter distortion component estimated in the processing of S34. For example, in the distortion component estimation portion 12, the rolling shutter distortion component estimated in the processing of S34 is set to be the same as the preceding value used in the processing of S36. Alternatively, the distortion component estimation portion 12 uses the rolling shutter distortion component estimated in the processing of S34 and a predetermined number of preceding values, and thereby performs weighted average. After the completion of the processing of S40, the process moves on to correction parameter calculation processing (S42).

On the other hand, when, in the processing of S38, the difference is determined not to be larger than the first threshold value, the process moves on to the correction parameter calculation processing (S42).

The correction parameter calculation processing (S42), the correction processing (S44) and the display (S46) are the same as the ones shown in FIG. 8.

As described above, according to the image processing device 1 of the third embodiment, the same function effects as the image processing device 1 of the first and second embodiments are produced, and the change larger than the predetermined value is detected among the changes of the rolling shutter distortion component, and thus it is possible to adjust the rolling shutter distortion component so as to reduce the change. Incidentally, in a conventional image processing device, when the distortion component is calculated from the image without the use of a gyro sensor or the like, the rolling shutter distortion is rapidly changed in a scene where the subject enters or exits the image plane. Hence, when the rolling shutter distortion component is used to correct the rolling shutter distortion, flicker or rattling occurs in the image (the frame image). On the other hand, in the image processing device 1 of the third embodiment, the rapid change of the rolling shutter distortion component is reduced, and thus it is possible to prevent flicker or rattling from occurring in the image. Thus, for example, it is possible to prevent the image from being unnaturally corrected even in the scene where the subject enters or exits the image plane.

(Fourth embodiment) The image processing device 1 of a fourth embodiment is configured substantially similar to the image processing device 1 of the first embodiment, and differs in part of the function of the motion vector acquisition portion 11. Specifically, the image processing device 1 of the fourth embodiment differs in that the motion vector acquisition portion 11 detects the change of the motion vector and that the camera motion is adjusted according to the change. In the following description, the different points from the image processing device 1 of the first embodiment will be mainly discussed, and redundant description will not be repeated.

Figure 12:
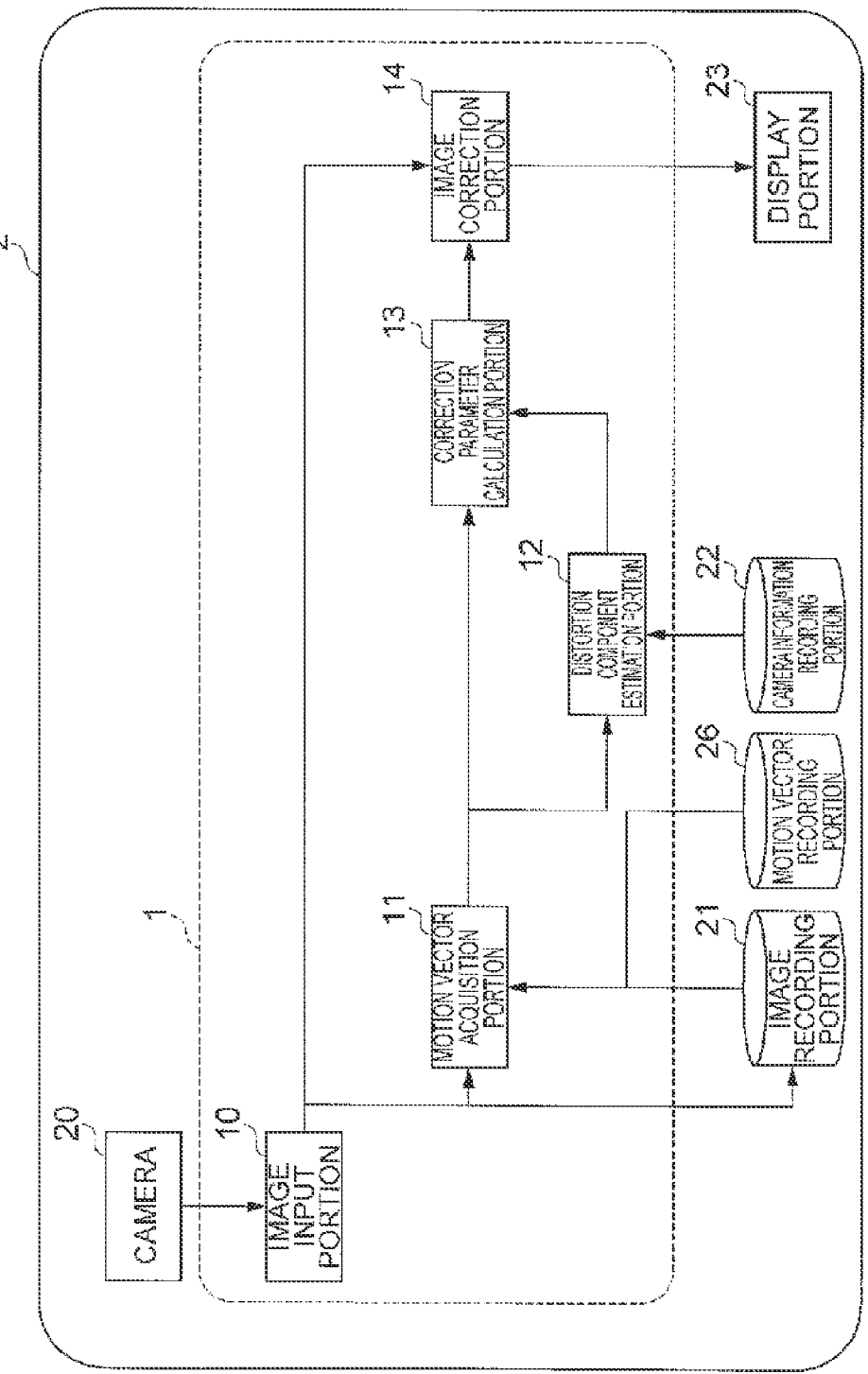
FIG. 12 is a functional block diagram of a mobile terminal incorporating an image processing device according to a fourth embodiment.

FIG. 12 is a functional block diagram of the mobile terminal 2 incorporating the image processing device 1 of the present embodiment. As shown in FIG. 12, the mobile terminal 2 includes a motion vector recording portion 26. The motion vector recording portion 26 is configured such that reading and writing can be performed from and in the motion vector recording portion 26 by the motion vector acquisition portion 11. The motion vector recording portion 26 stores the history of the motion vector acquired by the motion vector acquisition portion 11.

When the motion vector acquisition portion 11 acquires the motion vector, the motion vector acquisition portion 11 records it in the motion vector recording portion 26. Then, the motion vector acquisition portion 11 determines whether or not the acquired motion vector is rapidly changed as compared with the preceding value stored in the motion vector recording portion 26. The preceding value refers to the motion vector that is acquired in the immediately preceding frame image. For example, the motion vector acquisition portion 11 calculates a difference between the estimated motion vector and the preceding value, and determines, when the difference value is larger than a first threshold value, that a rapid change occurs. Then, when the motion vector acquisition portion 11 determines that a rapid change occurs, the motion vector acquisition portion 11 adjusts the motion vector. The motion vector acquisition portion 11 performs the adjustment so that the difference is reduced. For example, in the motion vector acquisition portion 11, the motion vector is set to be the same as the motion vector of the preceding frame image. Alternatively, the motion vector acquisition portion 11 uses the motion vector and the motion vectors of the preceding frame images, and thereby performs weighted average. In the distortion component estimation portion 12, the number of motion vectors of the preceding frame images selected for performing weighted average is set equal to or less than a second threshold value. By adjusting the second threshold value, it is possible to adjust the degree of reducing the change of the motion vector. The other configurations are the same as the image processing device according to the first embodiment. The image processing program of the present embodiment is configured similar to the image processing program of the first embodiment.

Figure 13:
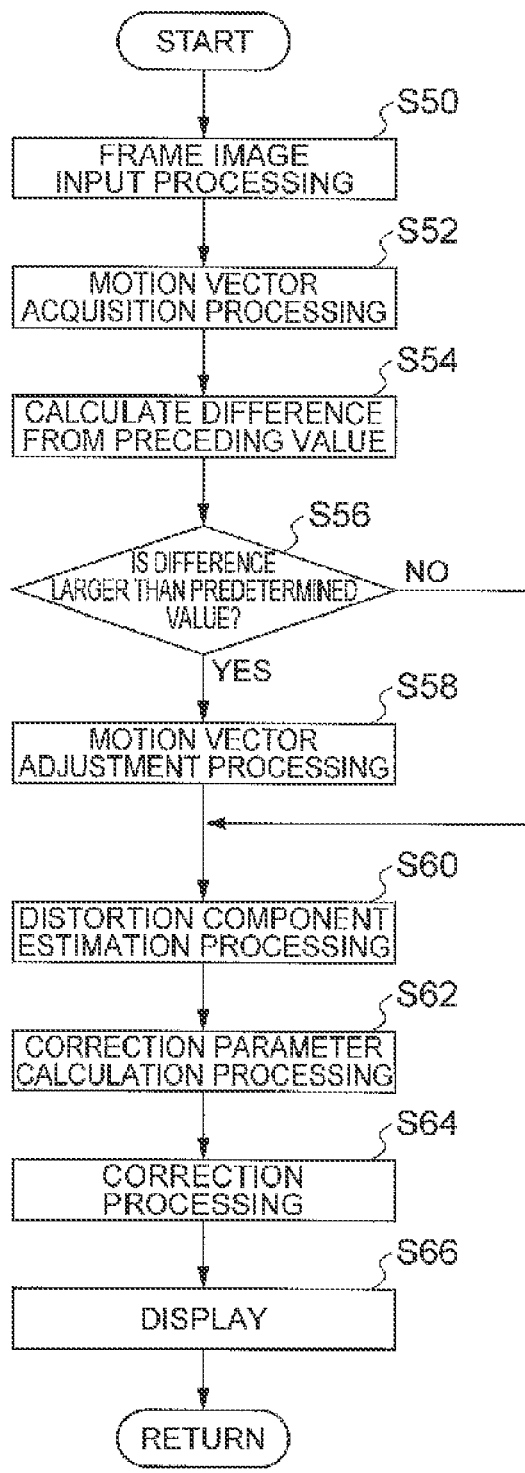
FIG. 13 is a flowchart showing the operation of the image processing device of FIG. 12.

The operation of the image processing device 1 according to the present embodiment will now be described. FIG. 13 is a flowchart showing the operation of the image processing device 1 according to the present embodiment. The control processing shown in FIG. 13 is performed, for example, when the imaging function of the mobile terminal 2 is turned on, and is repeated at predetermined intervals.

Frame image input processing (S50) and motion vector acquisition processing (S52) shown in FIG. 13 are the same as the ones shown in FIG. 8.

In the processing of S54, the motion vector acquisition portion 11 references the motion vector recording portion 26, and thereby acquires the motion vector (the preceding value) estimated in the preceding frame image. Then, the motion vector acquisition portion 11 calculates a difference between the motion vector calculated in the processing of S52 and the preceding value. After the completion of the processing of S54, the process moves on to difference determination processing (S56).

In the processing of S56, the motion vector acquisition portion 11 determines whether or not the difference calculated in the processing of S54 is larger than a predetermined value (a first threshold value). When, in the processing of S54, the difference is determined to be larger than the first threshold value, the process moves on to adjustment processing (S58).

In the processing of S58, the motion vector acquisition portion 11 adjusts the motion vector acquired in the processing of S52. For example, the motion vector acquired in the processing of S54 is set to be the same as the preceding value used in the processing of S54. Alternatively, the motion vector acquisition portion 11 uses the motion vector acquired in the processing of S52 and a predetermined number of preceding values, and thereby performs weighted average. After the completion of the processing of S58, the process moves on to distortion component estimation processing (S60).

On the other hand, when, in the processing of S56, the difference is determined not to be larger than the first threshold value, the process moves on to the distortion component estimation processing (S60).

The distortion component estimation processing (S60), the correction parameter calculation processing (S62), the correction processing (S64) and the display (S66) are the same as the ones shown in FIG. 8.

As described above, according to the image processing device 1 of the fourth embodiment, the same effects as the image processing device 1 of the first and second embodiments are produced, and the change larger than the predetermined value is detected among the changes of the motion vector, and thus it is possible to adjust the motion vector so as to reduce the change. Incidentally, in the conventional image processing device, when the distortion component is calculated from the image without the use of a gyro sensor or the like, the rolling shutter distortion is rapidly changed in a scene where the subject enters or exits the image plane. Hence, when the motion vector is used to correct the rolling shutter distortion, flicker or rattling occurs in the image (the frame image). On the other hand, in the image processing device 1 of the fourth embodiment, the rapid change of the motion vector is reduced, and thus it is possible to prevent flicker or rattling from occurring in the image. Thus, for example, it is possible to prevent the image from being unnaturally corrected even in the scene where the subject enters or exits the image plane.

The embodiments described above are examples of the image processing device according to the present invention. The image processing device according to the present invention is not limited to the image processing device 1 according to the embodiments; the image processing device according to the embodiments may be varied without departing from the content of each claim or may be applied to another device.

For example, although, in each of the embodiments described above, a description is given of the example where the camera 20 acquires the frame image, an image transmitted through a network from another device may be used.

The image processing device 1 according to each of the embodiments may be operated together with a camera shake correction device. For example, there is a camera shake correction device in which a plurality of successive frame images shot successively is used, and thus one corrected frame image is output. In the camera shake correction device described above, the image processing device 1 according to the embodiments described above is employed, and thus it is possible to correct the rolling shutter distortion between the successive frame images, with the result that it is possible to further accurately perform camera shake correction.

Furthermore, as a variation of the third and fourth embodiments described above, movement information detected with a gyro sensor may be utilized, a difference between the camera motion component detected by the motion vector acquisition portion 11 and the movement information from the gyro sensor may be acquired and the rolling shutter distortion component may be adjusted when the difference is rapidly changed.

Reference Signs List

1: image processing device, 10: image input portion, 11: motion vector acquisition portion, 12: distortion component estimation portion, 13: correction parameter calculation portion, 14: image correction portion, 20: camera (imaging device), 21: image recording portion, 22: camera information recording portion, 23: display portion, 24: gyro sensor, 25: motion vector recording portion, 26: motion vector recording portion

The invention claimed is:

1. An image processing device that processes an image, comprising:
   an image input portion inputting a target image that is an image to be processed;
   a motion vector acquisition portion acquiring a motion vector generated by relative movement with respect to a subject drawn in the target image when an imaging device generates the target image; and
   a distortion component estimation portion estimating a rolling shutter distortion component associating a coordinate system of the target image without distortion with a coordinate system of the target image with distortion based on a parallel movement component the motion vector and a distortion coefficient.

2. The image processing device according to claim 1, wherein
   the distortion component estimation portion estimates the rolling shutter distortion component based on the motion vector and a setting value of an imaging condition of the imaging device.

3. The image processing device according to claim 1, wherein
   the motion vector acquisition portion is configured to be able to refer to a recording portion which stores a last image which was generated immediately before the target image, and acquires the motion vector based on the last image stored in the recording portion and the target image.

4. The image processing device according to claim 1, wherein
   the motion vector acquisition portion acquires the motion vector detected by a gyro sensor included in the imaging device.

5. The image processing device according to claim 1, further comprising:

a correction portion correcting the target image based on the rolling shutter distortion component.

6. The image processing device according to claim 5, wherein the correction portion is configured to be able to refer to the recording portion which stores a last history of the rolling shutter distortion component, and adjusts the rolling shutter distortion component in the target image so that, when a difference between the last rolling shutter distortion component stored in the recording portion and the rolling shutter distortion component in the target image is larger than a predetermined value, the difference is reduced.

7. The image processing device according to claim 1, wherein the motion vector acquisition portion is configured to be able to refer to the recording portion which stores the motion vector, and adjusts the motion vector in the target image so that, when a difference between the last motion vector stored in the recording portion and the motion vector in the target image is larger than a predetermined value, the difference is reduced.

8. An image processing method for processing an image, comprising:

an image input step of inputting a target image which is an image to be processed;

a motion vector acquisition step of acquiring a motion vector generated by relative movement with respect to a subject drawn in the target image when an imaging device generates the target image; and a distortion component estimation step of estimating a rolling shutter distortion component associating a coordinate system of the target image without distortion with a coordinate system of the target image with distortion based on a parallel movement component of the motion vector and a distortion coefficient.

9. A non-transitory storage medium storing an image processing program for causing a computer to operate to process an image, the program causing the computer to operate as:

an image input portion inputting a target image that is an image to be processed;

a motion vector acquisition portion acquiring a motion vector generated by relative movement with respect to a subject drawn in the target image when an imaging device generates the target image; and a distortion component estimation portion estimating a rolling shutter distortion component associating a coordinate system of the target image without distortion with a coordinate system of the target image with distortion based on a parallel movement component of the motion vector and a distortion coefficient.

* * * * *